(12) United States Patent
Yang

(10) Patent No.: US 10,001,835 B2
(45) Date of Patent: Jun. 19, 2018

(54) HEAD UP DISPLAY AUTOMATIC CORRECTION METHOD AND CORRECTION SYSTEM

(71) Applicant: Hyundai Motor Company, Seoul (KR)

(72) Inventor: Changmo Yang, Chungju (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/292,284

(22) Filed: Oct. 13, 2016

(65) Prior Publication Data

US 2017/0168561 A1 Jun. 15, 2017

(30) Foreign Application Priority Data

Dec. 10, 2015 (KR) .......................... 10-2015-0176046

(51) Int. Cl.
```
G09G 5/00      (2006.01)
G06F 3/01      (2006.01)
G06F 3/00      (2006.01)
B60K 35/00     (2006.01)
```
(52) U.S. Cl.
CPC .............. *G06F 3/013* (2013.01); *B60K 35/00* (2013.01); *G06F 3/005* (2013.01); *B60K 2350/2013* (2013.01); *B60K 2350/2052* (2013.01)

(58) Field of Classification Search
CPC ......... G06F 3/005; G06F 3/013; B60K 35/00; B60K 2350/2052; B60K 2350/2013
See application file for complete search history.

(56) References Cited

U.S. PATENT DOCUMENTS

| | | | |
|---|---|---|---|
| 2012/0050138 A1* | 3/2012 | Sato ........................ | B60K 35/00 345/4 |
| 2014/0085192 A1* | 3/2014 | Posa ....................... | G09G 3/001 345/156 |
| 2016/0103319 A1* | 4/2016 | Remillard .............. | G02B 27/01 345/1.3 |

FOREIGN PATENT DOCUMENTS

| | | |
|---|---|---|
| JP | 2004-212321 A | 7/2004 |
| KR | 10-2015-0092989 A | 8/2015 |

* cited by examiner

*Primary Examiner* — Nelson Rosario
*Assistant Examiner* — Andrew Lee
(74) *Attorney, Agent, or Firm* — Mintz Levin Cohn Ferris Glovsky and Popeo, P.C.; Peter F. Corless

(57) ABSTRACT

A head-up display (HUD) automatic correction method includes: projecting, by a HUD device, a head-up display image onto a windshield of a vehicle; photographing, by a camera disposed outside of the vehicle, the head-up display image; generating, by an image processing unit, a correction signal by analyzing the head-up display image photographed by the camera; and controlling, by a HUD controller, the HUD device to correct the head-up display image using the correction signal.

12 Claims, 4 Drawing Sheets

HEAD UP DISPLAY AUTOMATIC CORRECTION METHOD AND CORRECTION SYSTEM

CROSS-REFERENCE TO RELATED APPLICATION

This application claims priority to and the benefit of Korean Patent Application No. 10-2015-0176046 filed in the Korean Intellectual Property Office on Dec. 10, 2015, the entire contents of which are incorporated herein by reference as if fully set forth herein.

BACKGROUND OF THE DISCLOSURE (a) Technical Field

The present disclosure relates generally to a HUD automatic correction method. More particularly, the present disclosure relates to a head-up display automatic correction method and correction system which efficiently corrects a head-up display screen displayed on a windshield glass of a vehicle.

(b) Description of the Related Art

Recent vehicles have been equipped with a driver assistance system (DAS) to enhance convenience and safety for drivers while the vehicles are in motion. The DAS performs functions such as keeping track of the driving lane, generating an alarm when straying from the driving lane, maintaining a safe distance from adjacent vehicles, preventing a collision with adjacent obstacles, and controlling vehicle speed in accordance with traffic situations or road environments, using various cameras, radar sensors, etc., without any instruction from the driver.

DASs have previously been mounted only in expensive cars, but increasingly have been used in mid- and small-sized cars with a growing focus on eco-friendly, economical driving for protecting the environment and conserving energy resources. For example, the DAS may include a smart cruise control (SCC), a lane departure warning system (LDWS), a blind spot detection (BSD), an around view monitoring system (AVM), a head-up display (HUD), and the like.

Among those systems, the HUD unit is a system that displays various items of information, such as driving information of the vehicle or navigation information, on the windshield of the vehicle within the main view of the driver while the vehicle is in motion. The HUD unit can display images of various items of information on the windshield by reflecting and enlarging the images with a projector and an optical unit.

During manufacturing, the HUD unit is typically inspected in a vehicle inspection line. In this inspection process, it can be determined whether distorted images are displayed due to, for example, variation of an anti-double reflection film in the windshield, the quality of the HUD system, and/or assembly variation of the vehicle, when the images are projected to the windshield. Accordingly, since the HUD inspection process is usually performed manually by workers, the inspection cycle time increases, the work efficiency deteriorates, and it is difficult for the inspectors to manage the HUD unit quality.

The Description of the Related Art is provided above to help understanding the background of the present disclosure and may include matters out of the related art known to those skilled in the art. The information disclosed in this Background section is only for enhancement of understanding of the background of the disclosure, and therefore, it may contain information that does not form the related art that is already known to a person of ordinary skill in the art.

SUMMARY OF THE DISCLOSURE

The present disclosure has been made in an effort to provide a head-up display automatic correction method and correction system having advantages of being able to reduce a correction cycle by efficiently correcting the head-up display screen displayed onto the windshield glass of the vehicle and improve operation efficiency.

According to embodiments of the present disclosure, a HUD automatic correction method includes: projecting, by a HUD device, a head-up display image onto a windshield of a vehicle; photographing, by a camera disposed outside of the vehicle, the head-up display image; generating, by an image processing unit, a correction signal by analyzing the head-up display image photographed by the camera; and controlling, by a HUD controller, the HUD device to correct the head-up display image using the correction signal.

The generating of the correction signal may include: transforming the photographed head-up display image based on an eye point corresponding to an eye position of a driver viewing the windshield; and generating the correction signal using the transformed image.

The photographing of the head-up display image may include: moving the vehicle to a predetermined position; moving the camera to a position corresponding to the windshield of the vehicle; and photographing, by the camera, the head-up display image with the camera being in the moved position.

A moving device may move the camera to the position corresponding to the windshield of the vehicle.

The image processing unit may perform controller area network (CAN) communication with the HUD controller through an on-board diagnostics (OBD) connector installed in the vehicle.

The image processing unit and the camera may be connected to each other by a communication device and transmit/receive data to/from each other using the communication device, and the image processing unit and the HUD controller may be connected to each other by the communication device and transmit/receive data to/from each other using the communication device.

The image processing unit and the camera may be connected to each other by a communication device or an Ethernet connection and transmit/receive data to/from each other using the communication device or the Ethernet connection, and the image processing unit and the HUD controller may be connected to each other by the CAN communication or the Ethernet connection and transmit/receive data to/from each other using the communication device or the Ethernet connection.

Furthermore, according to embodiments of the present disclosure, a HUD automatic correction system includes: a HUD unit projecting a head-up display image onto a windshield of a vehicle; a camera disposed outside of the vehicle and photographing the head-up display image projected onto the windshield by the HUD unit; an image processing unit generating a correction signal by analyzing the head-up display image photographed by the camera; and a HUD controller controlling the HUD device to correct the head-up display image using the correction signal generated by the image processing unit.

The HUD unit may include: a HUD device projecting the head-up display image onto the windshield; and the HUD controller controlling the HUD device to correct the head-up display image using the correction signal generated by the image processing unit.

The system may further include a communication device wirelessly connecting the camera, the image processing unit, and the HUD controller to each other.

The image processing unit may transform the photographed head-up display image based on an eye point corresponding to an eye position of a driver viewing the windshield and generates the correction signal using the transformed image.

The system may further include a moving device moving the camera to a position corresponding to the windshield glass. The HUD controller or the image processing unit may control the moving device to move the camera to the position.

The system may further include an OBD connector installed in the vehicle. The image processing unit may perform CAN communication with the HUD controller through the OBD connector.

The camera and the image processing unit may wirelessly transmit/receive data to/from each other using an Ethernet connection or CAN communication.

Accordingly, by detecting the head-up display screen displayed on the windshield of the vehicle through an external camera and correcting the head-up display screen using the detected data, it is possible to efficiently perform the correction rather than performing the correction in the vehicle.

Further, according to embodiments of the present disclosure, it is possible to prevent precision deterioration resulting from the worker's manual operation, and reduce inspection time and correction time as compared to performing the correction in the vehicle.

<Description of symbols>

Figure 1:
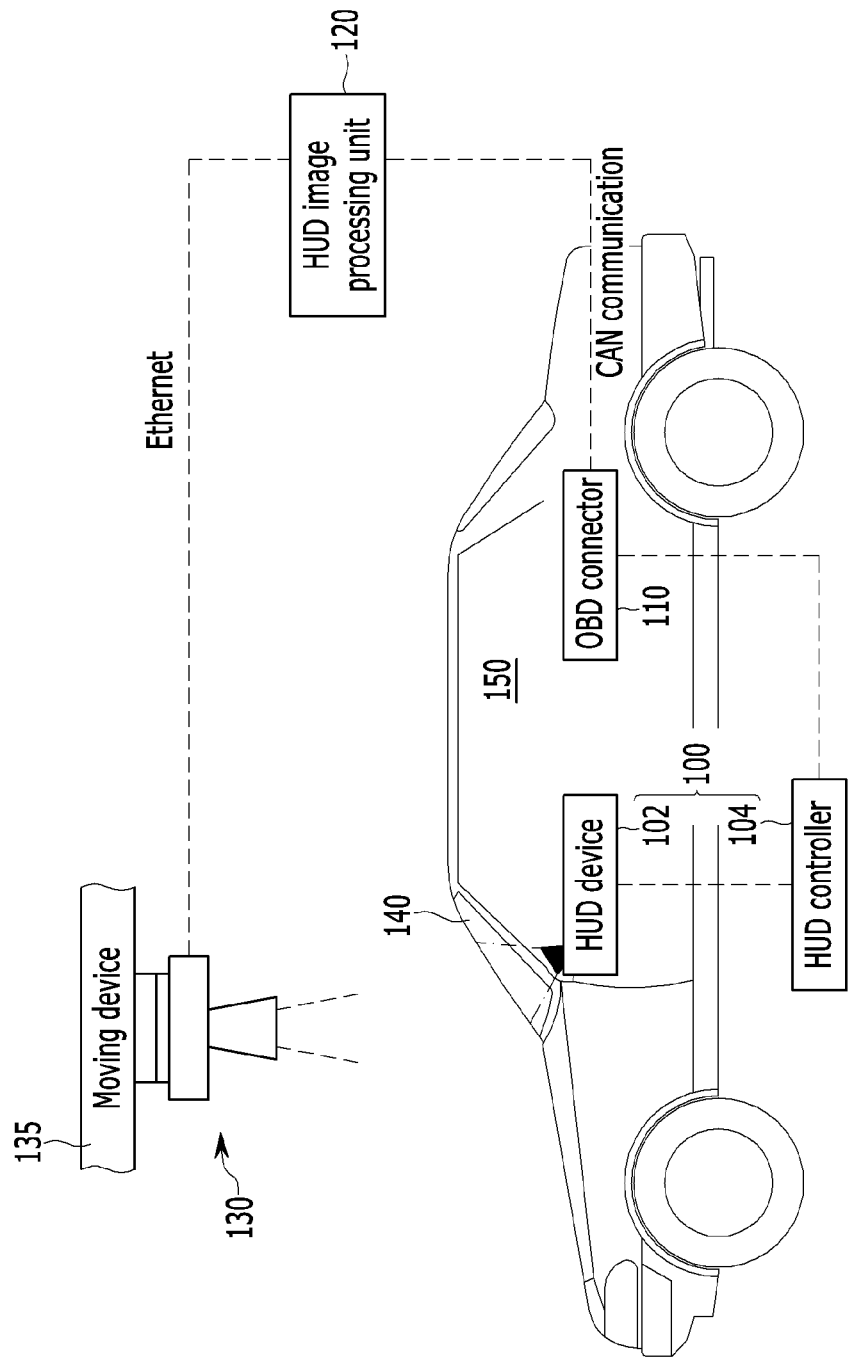
FIG. 1 is a schematic diagram of a HUD automatic correction system according to embodiments of the present disclosure.

| | |
|---|---|
| 102: HUD device | 104: HUD controller |
| 110: OBD connector | 120: image processing unit |
| 150: vehicle | 140: windshield glass |
| 130: camera | 135: moving device |

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Embodiments of the present disclosure will hereinafter be described in detail with reference to the accompanying drawings.

FIG. 1 is a schematic diagram of a HUD automatic correction system according to embodiments of the present disclosure.

As shown in FIG. 1, the head-up display (HUD) automatic correction system includes a vehicle 150, a windshield 140, a HUD unit 100, an on-board diagnostics (OBD) connector 110, an image processing unit 120, a camera 130, and a moving device 135.

The HUD unit 100 includes a HUD device 102 and a HUD controller 104 according to embodiments of the present disclosure. The HUD controller 104 controls the HUD device 102, and the HUD device 102 is disposed in the vehicle to project an image onto the windshield 140. The HUD controller 104 is disposed in the vehicle with the HUD device 102 or is disposed outside of the vehicle. The HUD controller 104 is configured to control the HUD device 102.

The camera 130 is disposed outside of the vehicle 150. The camera 130 is disposed on the windshield 140, and the moving device 135 moves the camera 130 to a predetermined position. Herein, the moving device 135 may be moved to a predetermined position by the HUD controller 104 or the image processing unit 120.

A head-up display image (alternatively referred to herein as a "glass image") projected from the HUD device 102 and formed on the windshield 140 is photographed by the camera 130 positioned outside of the vehicle 150. The image photographed by the camera 130 is wirelessly transmitted to the image processing unit 120 through an Ethernet connection.

The image processing unit 120 analyzes the image photographed by the camera 130, and generates a correction signal on the basis of the analyzed data. The correction signal is transmitted to the OBD connector 110 through controller area network (CAN) communication. The HUD controller 104 controls the HUD device 102 using the correction signal transmitted to the OBD connector 110, and corrects the glass image projected onto the windshield 140.

The image processing unit 120 transforms the image photographed by the camera 130 to an eye point image based on an eye point of a driver by a predetermined program or method, and generates the correction signals by using the eye point image. When the photographed image is transformed to the eye point image, the image processing unit 120 considers the type of the windshield 140 and the position of the eye point of the driver.

Figure 2:
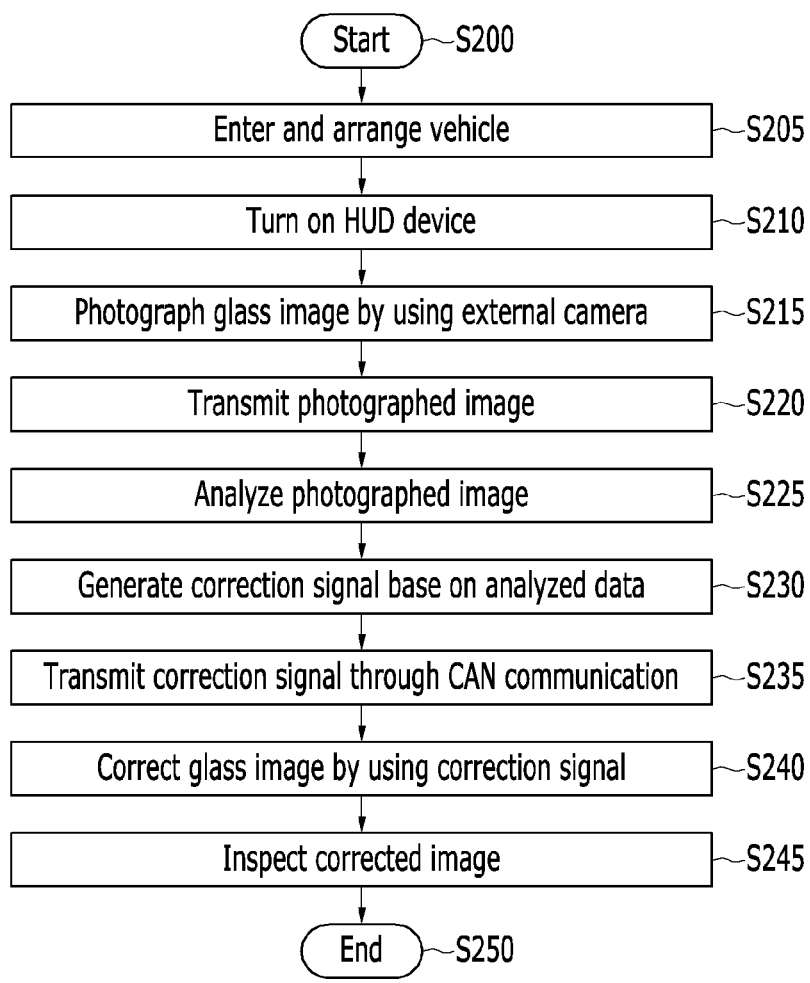
FIG. 2 is a flowchart showing a HUD automatic correction method according to embodiments of the present disclosure.

FIG. 2 is a flowchart showing a HUD automatic correction method according to embodiments of the present disclosure.

As shown in FIG. 2, control starts in step S200 and the vehicle 150 is entered and arranged to the predetermined position in step S205.

In step S210, the HUD device 102 is turned on by the HUD controller 104, and a predetermined image is projected onto the windshield 140 by the HUD device 102.

The camera 130 disposed outside of the vehicle 150 photographs the glass image projected onto the windshield 140 in step S215, and the image photographed by the camera 130 is transmitted to the image processing unit 120 in step S220.

The image processing unit 120 analyzes the photographed image transmitted from the camera 130 in step S225, and generates the correction signal on the basis of the analyzed data in step S230. Herein, the image processing unit 120 may transform the photographed image based on an eye point of a driver, and generate the correction signals by using the eye point image.

The image processing unit 120 transmits the correction signals to the HUD controller 104 through the OBD connector 110 using the CAN communication in step S235.

The HUD controller 104 controls the HUD device 102 using the correction signals received through the OBD connector 110 and corrects the glass image formed onto the windshield 140 in step S240.

Further, the camera 130 photographs the corrected glass image again and the image processing unit 120 determines whether the corrected glass image is passed or performs correction work again in step S245, and the control ends in step S250.

Figure 3:
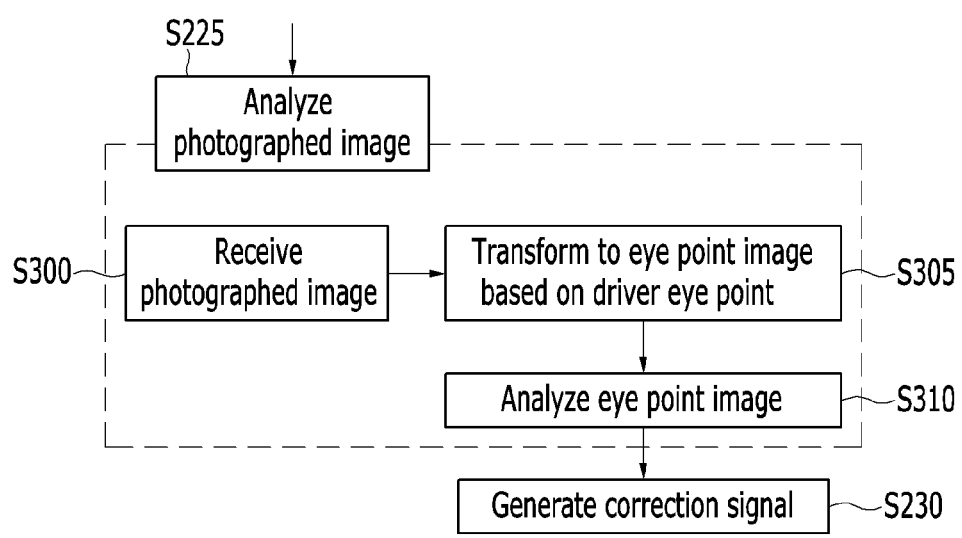
FIG. 3 is a flowchart showing a part of a HUD automatic correction method according to embodiments of the present disclosure.

FIG. 3 is a flowchart showing a part of a HUD automatic correction method according to embodiments of the present disclosure.

As shown in FIG. 3, the image processing unit 120 analyzes the photographed image transmitted from the camera 130 at step S225.

Then, the image processing unit 120 receives the photographed image from the camera 130 at step S300, and transforms the photographed image to the eye point image based on an eye point corresponding to an eye position of a driver at step S305. The image processing unit 120 analyzes the eye point image at step S310, and generates the correction signals on the basis of the analyzed data at step S320.

In an exemplary embodiment of the present disclosure, since the image photographed by the camera 130 is changed according to the curvature of the windshield 140 and the position of the driver's eye, the image processing unit 120 changes the photographed image to the eye point image and performs the correction work in the same condition as the state which views the glass image by the driver. Therefore, when the photographed image is transformed to the eye point image, the image processing unit 120 considers the type of the windshield glass 140 and the position of the eye point of the driver.

Figure 4:
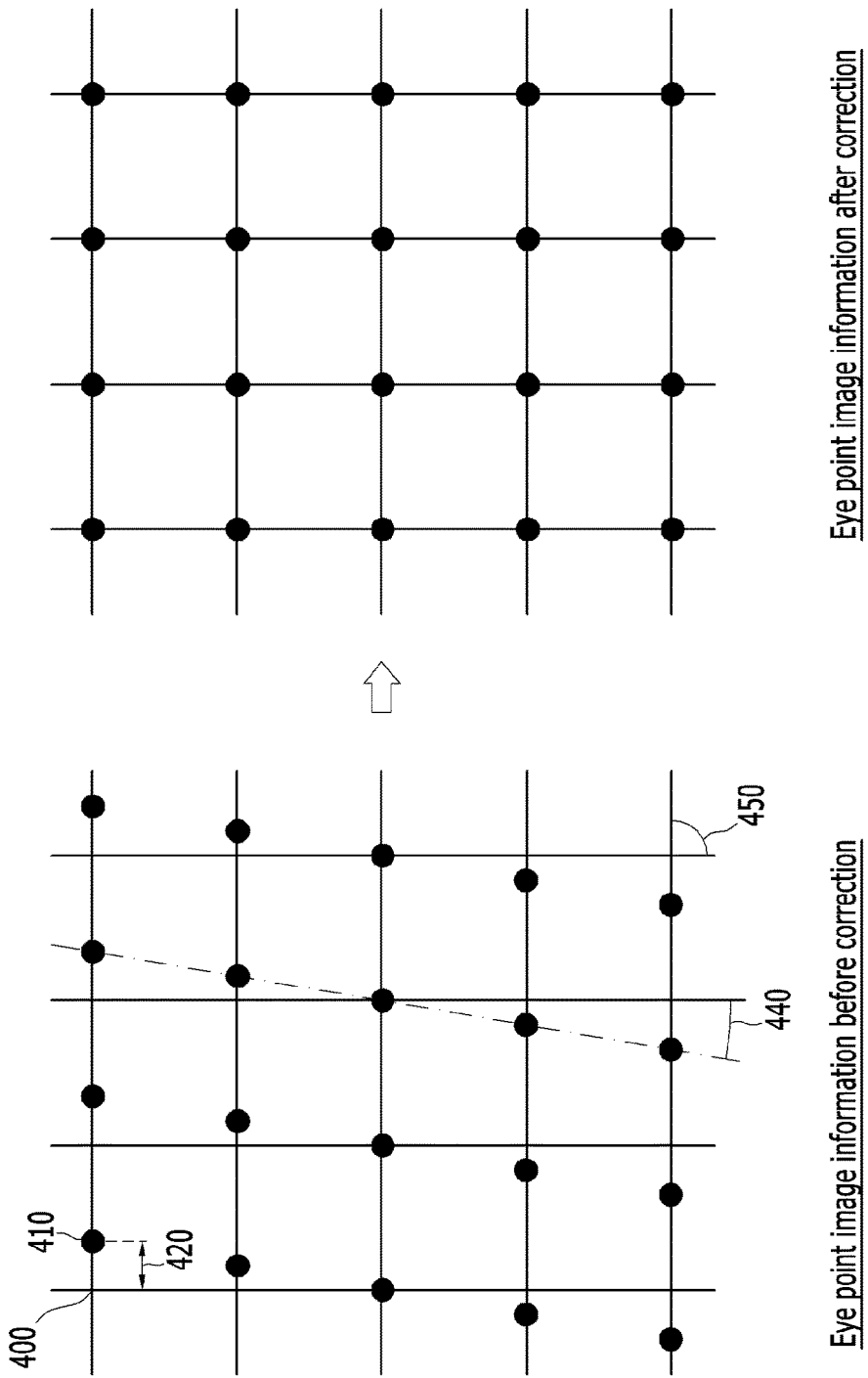
FIG. 4 is a drawing showing a glass image corresponding to an eye point of a driver in a HUD automatic correction method according to embodiments of the present disclosure.

FIG. 4 is a drawing showing a glass image corresponding to an eye point of a driver in a HUD automatic correction method according to embodiments of the present disclosure. The left side of FIG. 4 shows the eye point image before correction, and the right side of FIG. 4 shows the eye point image after correction.

Before the correction, an error 420 is generated between a reference lattice point 400 and an actual lattice point 410, an error angle occurs between a reference angle 450 and an actual angle 440. However, after the correction, the error between the reference lattice point and the actual lattice point is eliminated, and the error angle between the reference angle and the actual angle does not occur.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A head-up display (HUD) automatic correction method comprising:
   projecting, by a HUD device, a head-up display image onto a windshield of a vehicle;
   photographing, by a camera disposed outside of the vehicle, the head-up display image;
   generating, by an image processing unit, a correction signal by analyzing the head-up display image photographed by the camera;
   controlling, by a HUD controller, the HUD device to correct the head-up display image using the correction signal; and
   moving, by a moving device controlled by the HUD controller or the image processing unit, the camera to a position corresponding to the windshield of the vehicle.

2. The method of claim 1, wherein the generating of the correction signal comprises:
   transforming the photographed head-up display image based on an eye point corresponding to an eye position of a driver viewing the windshield; and
   generating the correction signal using the transformed image.

3. The method of claim 1, wherein the photographing of the head-up display image comprises:
moving the vehicle to a predetermined position; and
photographing, by the camera, the head-up display image with the camera being in the moved position.

4. The method of claim 3, wherein a moving device moves the camera to the position corresponding to the windshield of the vehicle.

5. The method of claim 3, wherein the image processing unit performs controller area network (CAN) communication with the HUD controller through an on-board diagnostics (OBD) connector installed in the vehicle.

6. The method of claim 1, wherein the image processing unit and the camera are connected to each other by a communication device and transmit/receive data to/from each other using the communication device, and the image processing unit and the HUD controller are connected to each other by the communication device and transmit/receive data to/from each other using the communication device.

7. The method of claim 1, wherein the image processing unit and the camera are connected to each other by a communication device or an Ethernet connection and transmit/receive data to/from each other using the communication device or the Ethernet connection, and the image processing unit and the HUD controller are connected to each other by the CAN communication or the Ethernet connection and transmit/receive data to/from each other using the communication device or the Ethernet connection.

8. A HUD automatic correction system, comprising:
a HUD unit projecting a head-up display image onto a windshield of a vehicle;
a camera disposed outside of the vehicle and photographing the head-up display image projected onto the windshield by the HUD unit;
an image processing unit generating a correction signal by analyzing the head-up display image photographed by the camera;
a HUD controller controlling the HUD unit to correct the head-up display image using the correction signal generated by the image processing unit; and
a moving device moving the camera to a position corresponding to the windshield,
wherein the HUD controller or the image processing unit controls the moving device to move the camera to the position.

9. The system of claim 8, further comprising a communication device wirelessly connecting the camera, the image processing unit, and the HUD controller to each other.

10. The system of claim 8, wherein the image processing unit transforms the photographed head-up display image based on an eye point corresponding to an eye position of a driver viewing the windshield and generates the correction signal using the transformed image.

11. The system of claim 8, further comprising an OBD connector installed in the vehicle,
wherein the image processing unit performs CAN communication with the HUD controller through the OBD connector.

12. The system of claim 8, wherein the camera and the image processing unit wirelessly transmit/receive data to/from each other using an Ethernet connection or CAN communication.

* * * * *